(12) United States Patent
Sun et al.

(10) Patent No.: US 10,107,296 B2
(45) Date of Patent: Oct. 23, 2018

(54) TURBOCHARGER SYSTEMS AND METHOD TO PREVENT COMPRESSOR CHOKE

(71) Applicant: Ford Global Technologies, LLC, Dearborn, MI (US)

(72) Inventors: Harold Huimin Sun, West Bloomfield, MI (US); Dave R. Hanna, Troy, MI (US); Thomas Polley, Livonia, MI (US); Liangjun Hu, Dearborn, MI (US); Daniel William Kantrow, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 976 days.

(21) Appl. No.: 13/926,949

(22) Filed: Jun. 25, 2013

(65) Prior Publication Data
US 2014/0377051 A1    Dec. 25, 2014

(51) Int. Cl.
| | |
|---|---|
| *F04D 27/02* | (2006.01) |
| *F01D 17/14* | (2006.01) |
| *F02C 6/12* | (2006.01) |
| *F04D 29/46* | (2006.01) |
| *F04D 29/42* | (2006.01) |
| *F04D 29/68* | (2006.01) |

(Continued)

(52) U.S. Cl.
CPC ....... *F04D 27/0246* (2013.01); *F01D 17/148* (2013.01); *F02C 6/12* (2013.01); *F04D 27/0207* (2013.01); *F04D 27/0215* (2013.01); *F04D 29/4213* (2013.01); *F04D 29/464* (2013.01); *F04D 29/685* (2013.01); *F02M 26/05* (2016.02); *F02M 26/06* (2016.02); *F05D 2220/40* (2013.01)

(58) Field of Classification Search
CPC .... F04D 27/009; F04D 27/02; F04D 27/0217; F04D 27/0246; F04D 27/002; F04D 29/464; F04D 29/462; F04D 29/4213; F02C 6/12; F01D 17/148; F01D 17/105; F01D 17/12; F02M 26/05; F02M 26/06; F02M 26/07; F05D 2220/40; F05D 2250/51; F05D 2260/606; F05D 2270/101
See application file for complete search history.

(56) References Cited

U.S. PATENT DOCUMENTS

| | | | | |
|---|---|---|---|---|
| 1,721,394 | A | * | 7/1929 | Holt ........................ F01D 17/00 415/17 |
| 2,827,224 | A | * | 3/1958 | Madison ................ F04D 29/462 138/37 |

(Continued)

*Primary Examiner* — Jason Shanske
*Assistant Examiner* — Wayne A Lambert
(74) *Attorney, Agent, or Firm* — Julia Voutyras; McCoy Russell LLP

(57) ABSTRACT

Systems and methods are provided for a turbocharger compressor, where the system may comprise: an actuatable annular disk comprising choke slots therein; an outer annular disk comprising choke slots therein; and an actuator to rotate the actuatable annular disk relative to the outer annular disk to vary alignment of the choke slots of the actuatable annular disk and the outer annular disk. The actuator may be controlled by an engine controller responsive to operating conditions of the compressor and actuated to align choke slots. Alignment of the choke slots allows air to be drawn into the impeller effectively expanding the compressor flow capacity to prevent compressor choke.

20 Claims, 14 Drawing Sheets

(51) Int. Cl.
*F02M 26/05* (2016.01)
*F02M 26/06* (2016.01)

(56) References Cited

U.S. PATENT DOCUMENTS

| | | | | |
|---|---|---|---|---|
| 3,372,862 A * | 3/1968 | Koenig, III | ........... | F04D 29/462 415/146 |
| 3,396,904 A * | 8/1968 | Janette | ................ | F04D 29/4213 251/212 |
| 3,504,986 A * | 4/1970 | Jackson | .............. | F04D 15/0011 415/11 |
| 3,880,402 A * | 4/1975 | Fleischer | ................. | F16K 3/34 251/212 |
| 3,904,308 A * | 9/1975 | Ribaud | ................... | F04D 21/00 415/143 |
| 4,532,961 A * | 8/1985 | Walton | .................... | F16K 3/085 137/625.31 |
| 4,676,717 A * | 6/1987 | Willyard, Jr. | ........... | F01D 9/026 29/402.08 |
| 4,743,161 A * | 5/1988 | Fisher | ................. | F04D 29/4213 415/116 |
| 4,886,416 A * | 12/1989 | Wunderlich | .......... | F01D 17/143 415/158 |
| 4,930,978 A * | 6/1990 | Khanna | ............... | F04D 27/0207 415/58.3 |
| 4,930,979 A * | 6/1990 | Fisher | ................... | F04D 29/685 415/206 |
| 4,990,053 A * | 2/1991 | Rohne | ................. | F04D 27/0215 415/143 |
| 5,267,829 A * | 12/1993 | Schmidt | ................ | F01D 17/167 415/157 |
| 5,333,990 A * | 8/1994 | Foerster | .............. | F04D 29/4213 415/58.4 |
| 5,855,117 A * | 1/1999 | Sumser | ................. | F01D 17/143 415/158 |
| 6,196,789 B1 * | 3/2001 | McEwen | ............. | F04D 27/0215 415/119 |
| 6,378,307 B1 * | 4/2002 | Fledersbacher | ......... | F02B 37/10 123/559.1 |
| 6,623,239 B2 * | 9/2003 | Sahay | ..................... | F02B 37/16 415/11 |
| 6,634,174 B2 * | 10/2003 | Sumser | ................. | F02B 37/225 60/602 |
| 6,648,594 B1 * | 11/2003 | Horner | .................... | F04D 25/04 415/144 |
| 6,699,008 B2 * | 3/2004 | Japikse | ............... | F04D 27/0207 415/144 |
| 7,083,379 B2 * | 8/2006 | Nikpour | ............. | F04D 27/0246 415/144 |
| 7,204,241 B2 * | 4/2007 | Thompson | ........... | F01M 13/021 123/572 |
| 7,229,243 B2 * | 6/2007 | Nikpour | .............. | F04D 29/4213 415/144 |
| 7,575,411 B2 * | 8/2009 | Wood | ........................ | F02C 6/12 415/58.4 |
| 7,698,894 B2 * | 4/2010 | Wood | ..................... | F02B 37/22 123/572 |
| 8,037,684 B2 * | 10/2011 | Petitjean | ............... | F01D 17/143 415/126 |
| 8,061,974 B2 * | 11/2011 | Gu | ...................... | F04D 27/0207 415/145 |
| 8,113,770 B2 * | 2/2012 | Lombard | ................ | F01D 17/14 415/145 |
| 8,287,233 B2 * | 10/2012 | Chen | ................... | F04D 27/0207 415/151 |
| 2001/0053325 A1 * | 12/2001 | Jinnai | ....................... | F02C 6/12 415/148 |
| 2007/0231125 A1 * | 10/2007 | Oeschger | ............... | F04D 29/462 415/160 |
| 2009/0263234 A1 * | 10/2009 | Yin | ...................... | F04D 29/444 415/58.4 |
| 2010/0239410 A1 * | 9/2010 | Nikpour | ............... | F04D 17/025 415/1 |
| 2011/0173975 A1 | 7/2011 | Sun et al. | | |

* cited by examiner

TURBOCHARGER SYSTEMS AND METHOD TO PREVENT COMPRESSOR CHOKE

GOVERNMENT RIGHTS

This invention was made with government support under DE-FC26-07-NT43280 awarded by the Department of Energy. The government has certain rights in the invention.

TECHNICAL FIELD

The present application relates to systems for turbochargers of internal combustion engines and control of compressor choke in some examples.

BACKGROUND AND SUMMARY

Engines may use a turbocharger to improve engine torque/power output density. In one example, a turbocharger may include a compressor and a turbine connected by a drive shaft, where the turbine is coupled to the exhaust manifold side and the compressor is coupled to the intake manifold side. In this way, the exhaust-driven turbine supplies energy to the compressor to increase the flow of air into the engine.

The compressor is intended to work in an operating range between two conditions, surge and choke. Surge occurs during low air mass flow, when the air flow through the compressor stalls and may reverse. The reversal of air flow may cause the engine to lose power. One source of surge, tip-out surge, may occur when the engine suddenly decelerates. During tip-out surge, the engine and the air flow mass through the compressor may slow down, while the turbocharger continues to spin due to inertia and delays through the exhaust system. The spinning compressor and low air flow rate may cause rapid pressure build-up on the compressor outlet, while the lagging higher exhaust flow rate may cause pressure reduction on the turbine side. When forward flow through the compressor can no longer be sustainable, a momentary flow reversal occurs, and the compressor is in surge.

A second source of surge may be caused in part by high levels of cooled exhaust gas recirculation (EGR). EGR may be used for reducing $NO_x$ emissions from diesel engines and for controlling knock in gasoline engines. High levels of EGR may increase compressor pressure while decreasing mass flow through the compressor causing the compressor to operate inefficiently or in the surge region.

Choke occurs when the air flow mass flowing through the compressor cannot be increased for a given speed of the compressor. During choke, the turbocharger cannot provide additional air to the engine, and so the engine power output density cannot be increased.

Therefore, it can be desirable to increase the operating range of the compressor and the turbocharger by reducing the air flow rate before surge occurs and increasing the air flow rate before choke occurs. One solution that has been used to widen the operating point is a passive casing treatment. The passive casing treatment includes a pair of immovable slots that modify the air flow through the compressor. During low air mass flow conditions, the slots of the passive casing treatment may provide a path to recirculate partially pressurized air back to the compressor inlet. The recirculated air flowing through the compressor may enable less air to flow through the compressor before surge occurs. During high air mass flow conditions, the slots of the passive casing treatment may provide a path to short-circuit air flow through the compressor so that the choke occurs at a higher air mass flow rate.

However, the inventors herein have recognized that an effective location for a passive recirculation port to prevent surge is different from an effective location for a port to prevent choke. In the present disclosure a continuously open port to prevent surge is disclosed as is a separate port to prevent choke, the inlet of which may be opened or closed to airflow through a compressor inlet. A bleed port may be arranged such that its inlet is at a height below the full blades of a compressor impeller but above the splitter blades. Conversely, the choke port may serve to provide air to the base of the impeller, below the splitter and turbocharger blades. Opening an inlet of the choke port may furthermore be variable, such that an engine controller may control when, and the extent to which, the inlet of the choke port is exposed to airflow from the compressor inlet. Such a signal may be provided when a compressor is at near choke conditions. When the inlet of the choke port is open, air may be drawn into the compressor at its base and may serve to effectively extend the compressor flow capacity.

A compressor casing is disclosed herein that may have a pair of annular disks located at the periphery of the interior of compressor downstream of the inlet. The annular disks comprise alignable openings around their circumference, these choke slots may be aligned to open into an inlet of a choke port allowing air to be drawn into the base of the impeller. Furthermore, when not overlapping, the choke slots of the two annular disks effectively cut off the inlet of the choke port from air flow from the compressor inlet.

Systems and methods are disclosed for a turbocharger compressor, the system comprising: an actuatable annular disk comprising choke slots therein; an outer annular disk comprising choke slots therein; and an actuator to rotate the actuatable annular disk relative to the outer annular disk to vary alignment of the choke slots of the actuatable annular disk and the outer annular disk. The actuator may be controlled by an engine controller responsive to operating conditions of the compressor and actuated to align choke slots. Alignment of the choke slots allows air to be drawn into the impeller effectively expanding the compressor flow capacity to prevent compressor choke.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure. Further, the inventors herein have recognized the disadvantages noted herein, and do not admit them as known.

DETAILED DESCRIPTION

The object of the present disclosure is an actuatable port in fluid communication with the base of a compressor impeller. A pair of annular disks each containing choke slots at regular distances around their circumference are provided downstream of a compressor inlet. An actuator may rotate the inner, actuatable annular disk relative to the outer annular disk which it may be seated on. Rotation of the actuatable annular disk may vary alignment of the choke slots of the two disks causing the open space to overlap. The alignment of the choke slots may open an underlying choke port to the inlet of the compressor. The outlet of the choke port is in fluid communication with the base of the compressor at a height downstream of the leading edge of both the splitter and the full blades. Rotation of the actuatable annular disk and thus alignment of the choke slots may be controlled by an engine controller based on engine operating conditions. Opening of the choke port to the compressor inlet may effectively expand the compressor flow capacity and may prevent compressor choke. In this embodiment a bleed port in fluid communication with the compressor inlet and the impeller above the leading edge of the splitter blades and below the leading edge of the full blades is continuously open.

Figure 1:
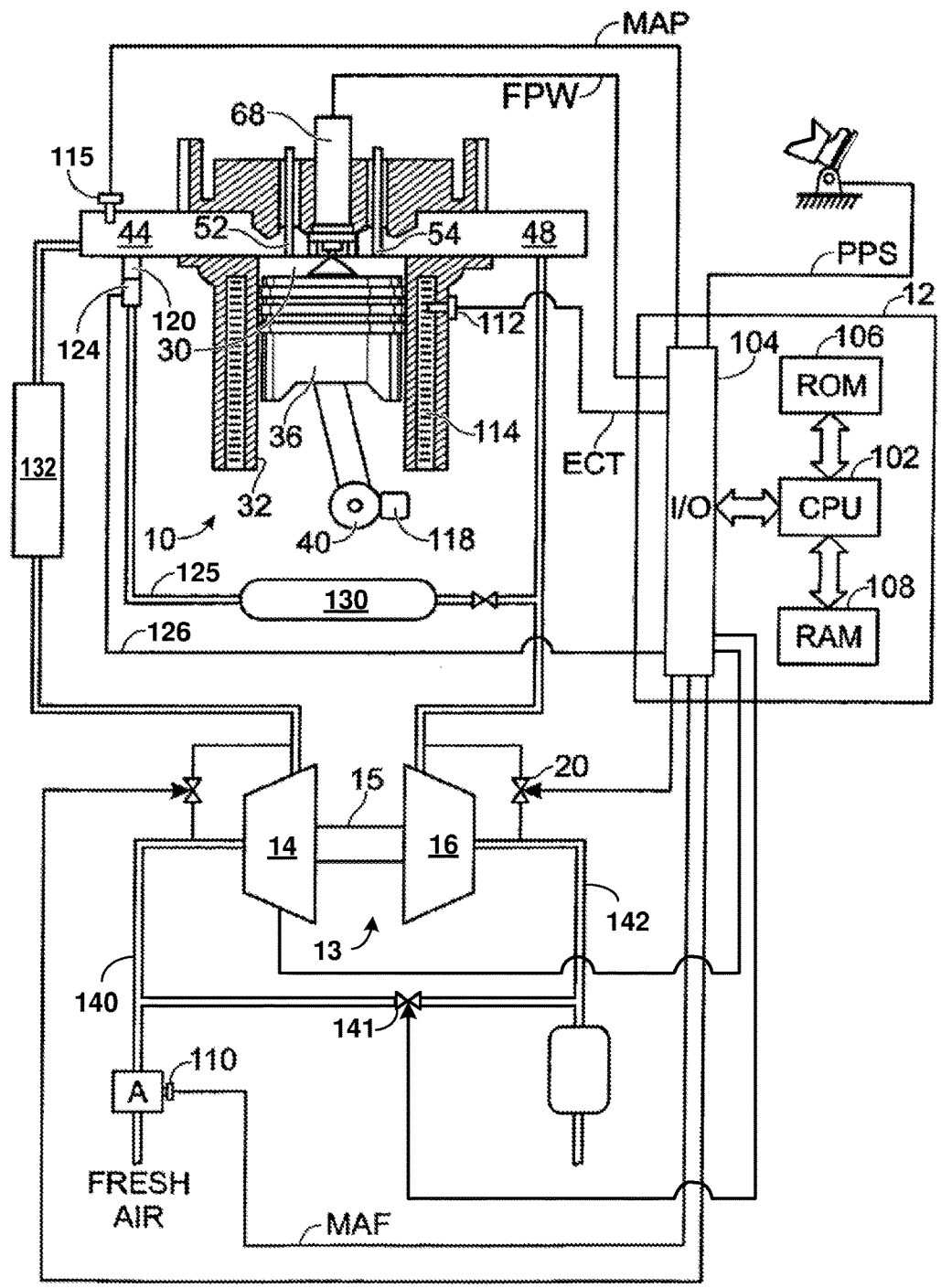
FIG. 1 shows a block diagram of a turbocharged engine with exhaust gas recirculation.
Figure 2:
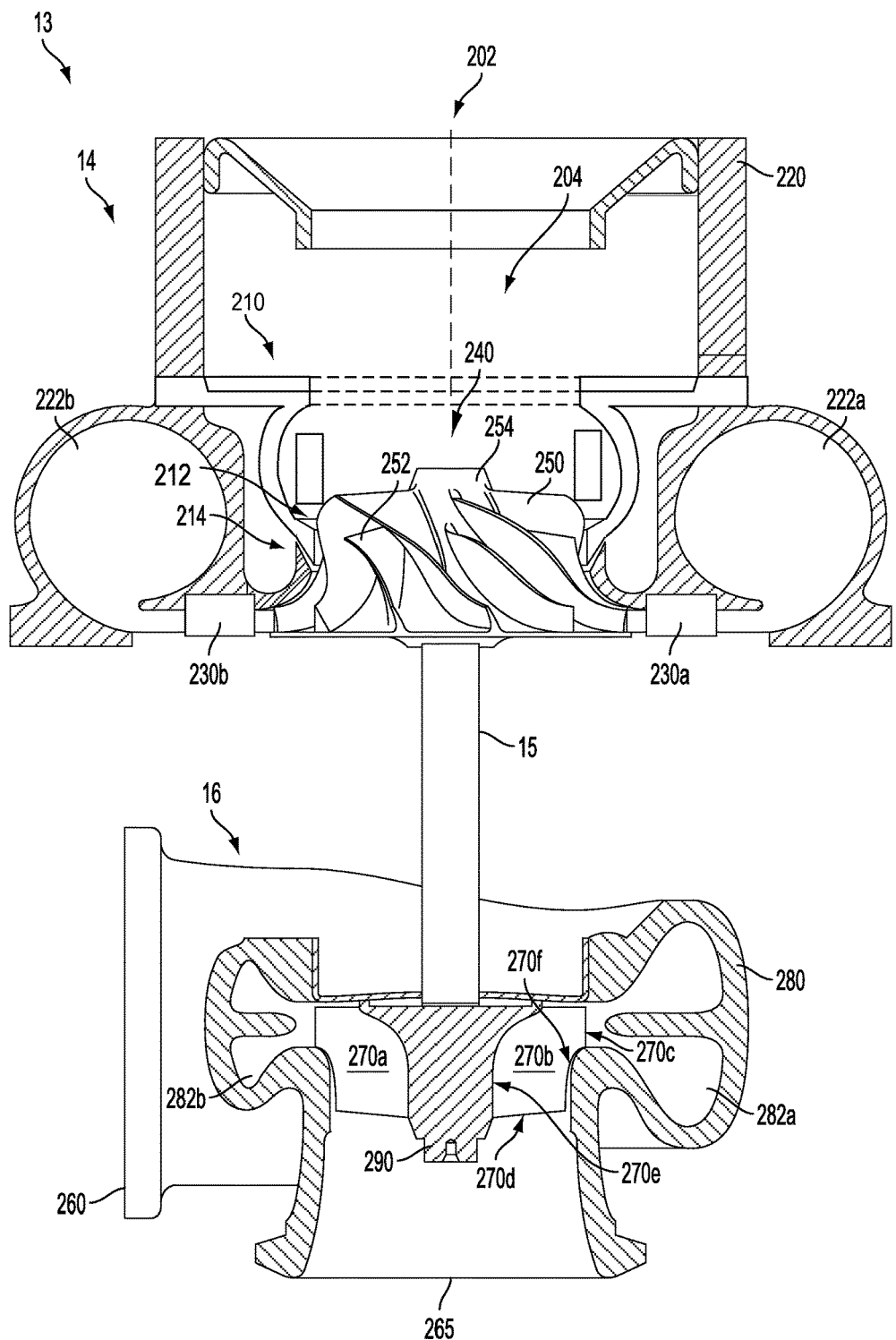
FIG. 2 shows a cut-away view of a turbocharger having a turbine and a compressor with a first embodiment of a casing treatment according to the present disclosure.

The casing treatment of the present disclosure will be described in greater detail below in reference to the FIGS. FIG. 1 shows a schematic depiction of a cylinder of an engine in accordance with the present disclosure. FIG. 2 shows a schematic depiction of a turbocharger comprising a compressor in accordance with the present disclosure. In a first embodiment of such a compressor, pictured in FIGS. 3-7, the annular disks are substantially flat and the outer compressor casing forms the inner walls of the various ports. In a second example embodiment, shown in FIGS. 8-13, the outer annular disk has a longer profile and forms parts of the choke port and the bleed port. FIGS. 3-13 are drawn to scale, although other relative dimensions may be used, if desired. FIG. 14 shows a flowchart of a method in accordance with the present disclosure.

FIG. 1 shows an example of a turbocharged engine with an EGR system. Specifically, internal combustion engine 10, comprising a plurality of cylinders, one cylinder of which is shown in FIG. 1, is controlled by controller 12. Engine 10 includes combustion chamber 30 and cylinder walls 32 with piston 36 positioned therein and connected to crankshaft 40. Combustion chamber 30 communicates with intake manifold 44 and exhaust manifold 48 via respective intake valve 52 and exhaust valve 54. Intake manifold 44 is also shown having fuel injector 68 coupled thereto for delivering fuel in proportion to the pulse width of signal (FPW) from controller 12.

Controller 12 is shown as a microcomputer, including microprocessor unit 102, input/output ports 104, an electronic storage medium for executable programs and calibration values shown as read only memory chip 106 in this particular example, random access memory 108, and a conventional data bus.

Controller 12 receives various signals from sensors coupled to engine 10, including but not limited to: measurements of inducted mass air flow (MAF) from mass air flow sensor 110 coupled to the air filter; engine coolant temperature (ECT) from temperature sensor 112 coupled to cooling sleeve 114; a measurement of manifold pressure (MAP) from manifold pressure sensor 115 coupled to intake manifold 44; and a profile ignition pick up signal (PIP) from Hall effect sensor 118 coupled to crankshaft 40 indicating an engine speed.

In a configuration known as high pressure EGR, exhaust gas is delivered to intake manifold 44 by EGR tube 125 communicating with exhaust manifold 48. EGR valve assembly 120 is located in EGR tube 125. Stated another way, exhaust gas travels from exhaust manifold 48 first through valve assembly 120, then to intake manifold 44. EGR valve assembly 120 can then be said to be located upstream of the intake manifold. There is also an optional EGR cooler 130 placed in EGR tube 125 to cool EGR before entering the intake manifold. Low pressure EGR may be used for recirculating exhaust gas from downstream of turbine 16 to upstream of compressor 14 via valve 141.

Pressure sensor 115 provides a measurement of manifold absolute pressure (MAP) to controller 12. EGR valve assembly 120 has a valve position (not shown) for controlling a variable area restriction in EGR tube 125, which thereby controls EGR flow. EGR valve assembly 120 can either minimally restrict EGR flow through tube 125 or completely restrict EGR flow through tube 125, or operate to variably restrict EGR flow. Vacuum regulator 124 is coupled to EGR valve assembly 120. Vacuum regulator 124 receives actuation signal 126 from controller 12 for controlling valve position of EGR valve assembly 120. In one embodiment, EGR valve assembly is a vacuum actuated valve. However, any type of flow control valve may be used, such as, for example, an electrical solenoid powered valve or a stepper motor powered valve.

Turbocharger 13 has a turbine 16 coupled in the exhaust manifold 48 and a compressor 14 coupled in the intake manifold 44 via an intercooler 132. Turbine 16 is coupled to compressor 14 via drive shaft 15. Air at atmospheric pressure enters compressor 14 from passage 140. Exhaust from turbine 16 exits passage 142. Various turbocharger arrangements may be used. For example, a variable nozzle turbocharger (VNT) may be used when a variable area nozzle is placed upstream and/or downstream of the turbine in the exhaust line for varying the effective expansion of gasses through the turbine. Still other approaches may be used for varying expansion in the exhaust, such as a waste gate valve. FIG. 1 shows an example valve 20 acting as a waste gate. As noted above, the valve may be located within the turbine, or may be a variable nozzle. FIG. 2 shows a cut-away view of an example embodiment of turbocharger 13.

Turbine 16 converts the energy of the exhaust gas into rotational energy for rotating drive shaft 15 connected to impeller 240. Exhaust gas from exhaust manifold 48 enters turbine housing 280 through turbine inlet 260. The exhaust gas flows through volute passage 282 expanding through turbine outlet 265 and out exhaust passage 142. The flow of exhaust gas through turbine 16 generates a force on blade 270 coupled to hub 290 causing blade 270, hub 290, and drive shaft 15 to rotate. Two blades, 270a and 270b, are shown for turbine 16, but one skilled in the art will appreciate that more blades may be present in turbine 16. Turbine blade 270 includes inlet edge 270c, outlet edge 270d, hub edge 270e, and casing edge 270f.

Compressor 14 includes impeller 240, diffuser 230, compressor chamber 222, paired annular disks 210, and casing 220. The rotation of impeller 240, draws gas into compressor 14 through compressor inlet 202 of casing 220. As non-limiting examples, the gas may include air from passage 140, exhaust gas (such as when using long loop EGR), gaseous fuel (such as when using port injection of fuel), and combinations thereof. Gas flows from compressor inlet 202 and is accelerated by impeller 240 through diffuser 230 into compressor chamber 222. Diffuser 230 and compressor chamber 222 decelerate the gas causing an increase in pressure in compressor chamber 222. Gas under pressure may flow from compressor chamber 222 to intake manifold 44.

Elements in turbocharger 13 may be described relative to the direction of the gas flow path through turbocharger 13. An element substantially in the direction of gas flow relative to a reference point is downstream from the reference point. An element substantially opposite the direction of gas flow relative to a reference point is upstream from the reference point. For example, compressor inlet 202 is upstream from impeller 240 which is upstream from diffuser 230. Diffuser 230 is downstream from impeller 240 which is downstream from compressor inlet 202.

Impeller 240 includes hub 254, full blade 250, and splitter blade 252. Full blade 250 and splitter blade 252 are attached to hub 254. The edge of full blade 250 that is most upstream in compressor 14 is the leading edge of full blade 250. Similarly, splitter blade 252 includes a leading edge at the most upstream portion of splitter blade 252. The leading edge of full blade 250 is upstream of splitter blade 252. Impeller 240 includes an axis of rotation aligned with the axis of rotation for drive shaft 15 and turbine hub 290. The axis of rotation is substantially parallel with the flow of gas at the compressor inlet and substantially perpendicular to the flow of gas at the diffuser.

Casing 220 includes compressor inlet 202 and intake passage 204. Various casing components may also contribute to bleed port 212, and choke port 214. Impeller 240 is contained in intake passage 204. An inlet of Bleed port 212 is downstream of the leading edge of full blade 250 and upstream of the leading edge of splitter blade 252. The outlet of choke port 214 is downstream of the leading edge of splitter blade 252. Bleed port 212 may be continuously open to compressor inlet 202. The choke port may be in fluid communication with the compressor inlet 202 if choke slots within the pair of annular disks 210 are aligned. The choke slots and the annular disks are described in greater detail below reference to FIGS. 3-13 which detail two embodiments of a compressor casing in accordance with the present disclosure.

Figure 3:
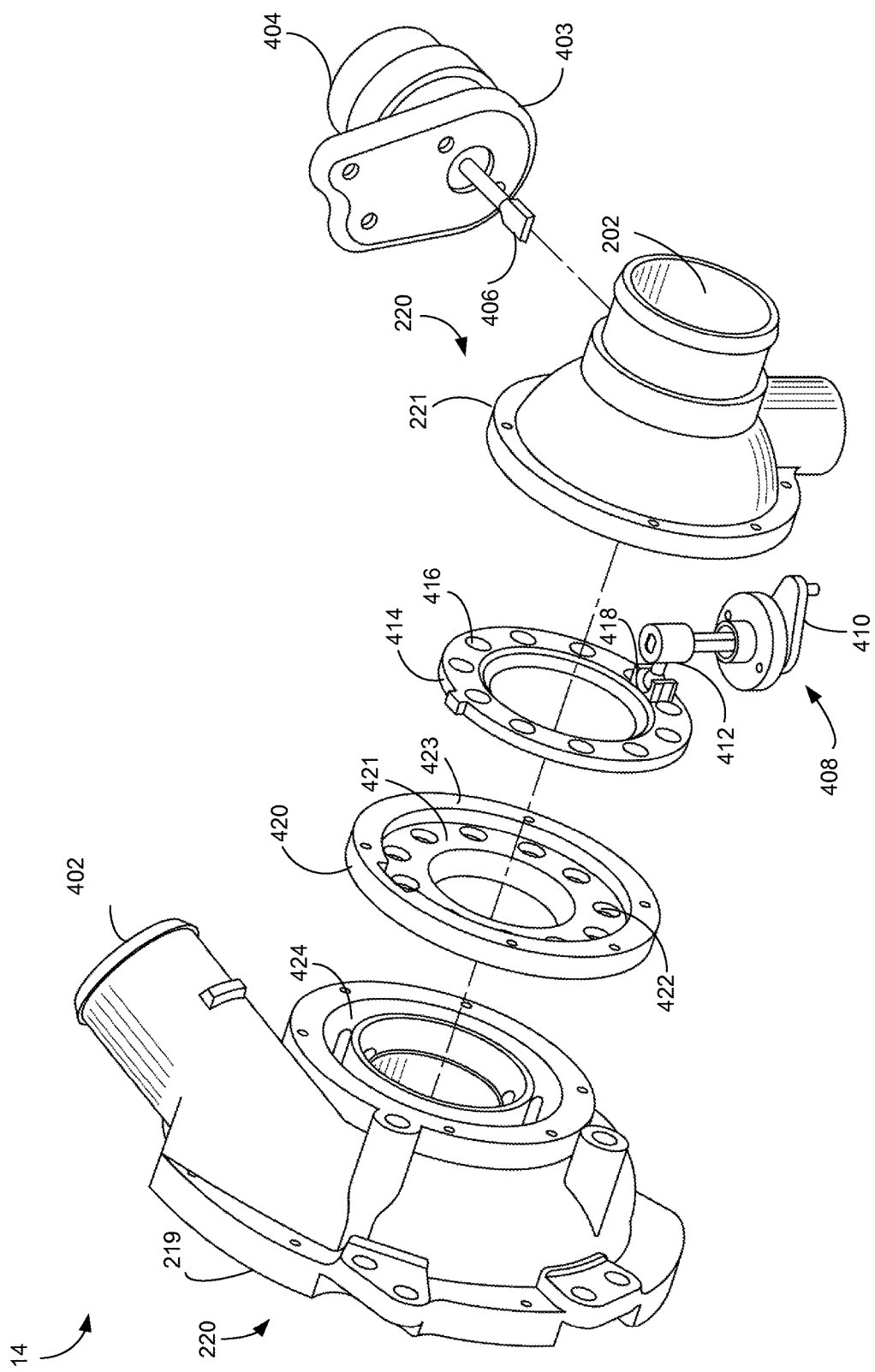
FIG. 3 shows an exploded view of compressor components with a first embodiment of a casing treatment according to the present disclosure.

A first embodiment of a compressor for the control of compressor choke is described below in reference to FIGS. 3-7. FIG. 3 shows an exploded view of compressor components, including the annular disks of the first embodiment of the casing treatment in accordance with the present disclosure. An outer casing 220 is shown. The outer casing my comprise an outlet piece 219 which may include a compressor chamber and the compressor outlet 402, as well as additional internal cavities and an inlet piece 221 which may comprise the compressor inlet 202. The outer casing 220 of the compressor may comprise die cast aluminum components as an example. The outlet piece 219 and inlet piece 221 may be bolted together around additional components therein. The components of the compressor are aligned axially with relative positions explained below.

In the present embodiment, the inlet piece 221 may have an attachment piece 403 connected to it. The attachment piece 403 may be configured to connect a vacuum actuator 404 to the compressor casing 220. The actuator 404 may further be a pneumatic or electric actuator and may be controlled by engine controller 12. The actuator 404 may comprise a connecting rod 406 suitable to translate the motion of actuator 404 to actuator choke slot controller 408. The actuator may be controlled by engine controller 12 in response to turbocharger conditions including speed and air flow rate, or may be controlled by estimates of the conditions of a turbocharger compressor based on engine, speed, load, and throttle position, as examples.

As pictured in FIG. 3, choke slot controller 408 comprises a lever arm 410 which interacts with connecting rod 406 of the actuator 404. A signal from engine controller 12 may result in the actuator 404 moving connecting rod 406. The movement may be translated to the lever arm 410 which, in turn, causes actuator pin 412 to rotate, transferring that rotation to actuatable annular disk 414.

Actuatable annular disk 414 may comprise a substantially flat circular ring. The bottom profile of the ring is sized to rest within the inset portion 421 of outer annular disk 420. The actuatable annular disk 414 and outer annular disk 420 may be in face sharing contact. The upstream face of the paired concentric disks may form a contiguous surface with a central opening. The rotational axis of the actuatable disk may be the same as that of the impeller 240 (shown in FIG. 2). Actuatable annular disk 414 may further comprise a raised choke selector 418 for the purpose of interacting with actuator pin 412. Rotation of the actuator pin 412 is translated by choke selector 418 to spinning or rotating of the actuatable disk 414. Choke slots 416 along the circumference of the actuatable annular disk 414 are subsequently rotated.

The choke slots 416 of the actuatable annular disk 414 may vary in alignment with choke slots 422 of outer annular disk 420. The choke slots 422 of the outer annular disk 420 are arranged along the circumference of the inset portion 421. The raised portion 423 of outer annular disk may be solid, impervious to airflow, and sized to contain or surround the actuatable annular disk and may serve as an attachment point for the paired annular disks to the outer casing 220 of the compressor 14. The outer annular disk may be stationary within the compressor.

Upon receiving a signal from engine controller 12, actuator 404 may produce motion that results in the rotation of the actuatable annular disk 414. Spinning of the actuatable annular disk may bring choke slots 416 and choke slots 422 of the outer annular disk 420 into alignment. Alignment of the ring of choke slots 416 and 422 may be continuously variable such that overlap may vary on a spectrum of not overlapping (e.g. the inlet to the choke port is blocked) to fully overlapping (e.g. the inlet to the choke port is fully open) to vary air flow through the pair of annular disks.

The annular disks may be positioned around the periphery of the interior space of the compressor, downstream of the inlet 202 surrounding the upper reaches of impeller 240 (shown in FIG. 3 without blades for simplicity of the drawing). The compressor casing 220 may be configured to house the annular disks and may include air cavities, including choke port 424. Air cavities such as choke port 424 within the compressor outer casing 220 may be arranged to receive airflow through an inlet when choke slots 416 and 422 are at least partially aligned.

Figure 4:
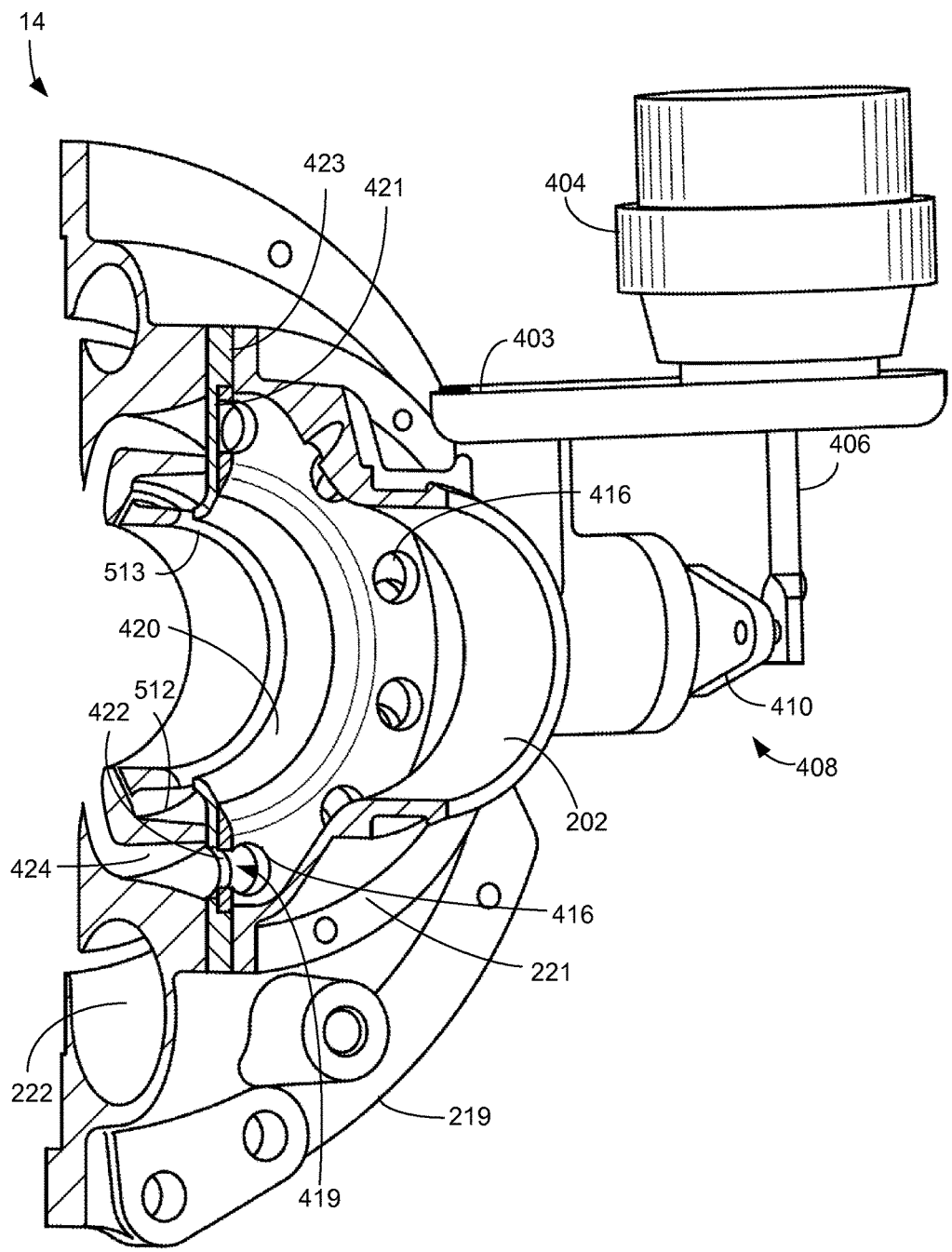
FIG. 4 shows a cross section in perspective view of compressor components with the first embodiment of the casing treatment according to the present disclosure.

Turning now to FIG. 4, a cross section of the compressor 14 is shown in perspective view. Outer annular disk 420 is seen held in place within the compressor housing 220. The raised portion of annular disk 420 may be bolted between inlet piece 221 and outlet piece 219 of the casing 220. The inset portion 421 of outer annular disk 420 may contain choke slots 422 and is configured to fit around actuatable annular disk 414, such that the actuatable annular disk is seated within the inset portion of the outer annular disk.

The lever arm 410 of choke slot controller 408 couples with choke selector 418 to control positioning of the actuatable annular disk 414. Movement of actuator 404 may be translated to a rotary motion of the actuatable annular disk 414 within the outer annular disk 420. Rotation of the actuatable annular disk 414 relative to the outer annular disk 420 may result in overlapping alignment of the choke slots 416 and 422. Alignment of the choke slots may be partial so that a fraction of the circular openings overlap or may be fully aligned such that the perimeter of the choke slots 416 of the actuatable annular disk 414 fully aligns with the choke slots 422 of the outer annular disk 420. In this way, opening of the underlying choke port inlet may continuously vary between fully open and fully closed.

When aligned (shown in FIG. 4 at partial overlap) the choke slots 416 and 422 may allow air flow into choke port 424. Choke port 424 is a space that may be formed of the outlet piece 219 in the compressor casing 220. The choke port 424 may be in fluid communication with the base of impeller 240 at a height downstream of the leading edge of the full blades and the splitter blades. The opening of the choke port to the compressor inlet 202 may allow airflow to be drawn into the impeller and may prevent compressor choke.

Furthermore, a bleed port 512 is shown. The bleed port may be continuously open to the compressor inlet 202 and may help to prevent compressor surge by allowing excess pressure at the compressor outlet to recirculate off the impeller. The bleed port of the present disclosure may be arranged concentrically and further to the center of compressor 14 relative to the choke port 424. An upstream opening 513 of the bleed port serves as an outlet for air to be recirculated toward the compressor inlet 202 in the event of compressor surge.

Figure 5:
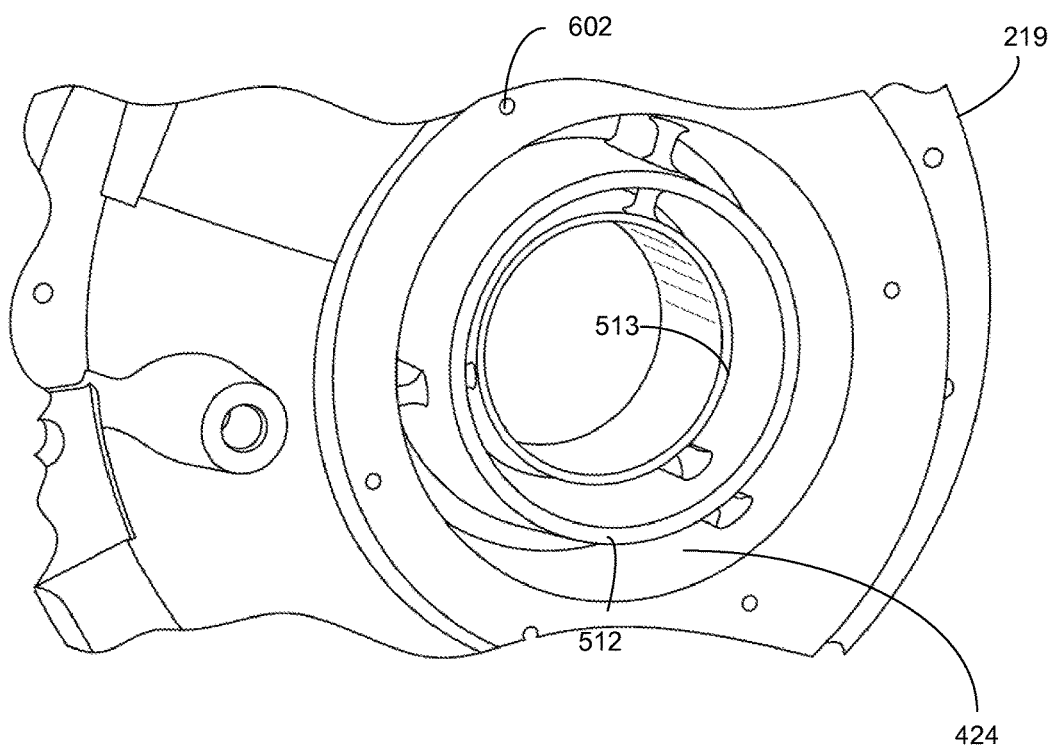
FIG. 5 shows a front view of section of an outer casing for a compressor with the first embodiment of the casing treatment according to the present disclosure.

Turning now to FIG. 5, a section of the outlet piece 219 of the compressor casing is shown. Choke port 424 may be seen at the periphery of the impeller (not shown). Visible on the outlet piece 219 of the compressor casing, to the outside of choke port 424 are bolt holes 602. Bolt holes 602 may be used in connecting raised portion 423 of outside annular disk 420 and inlet piece 221 together. This placement of the pair of annular disks directly adjacent the choke port 424 may provide an increased air volume to prevent choke flow when the choke slots are aligned.

Figure 6:
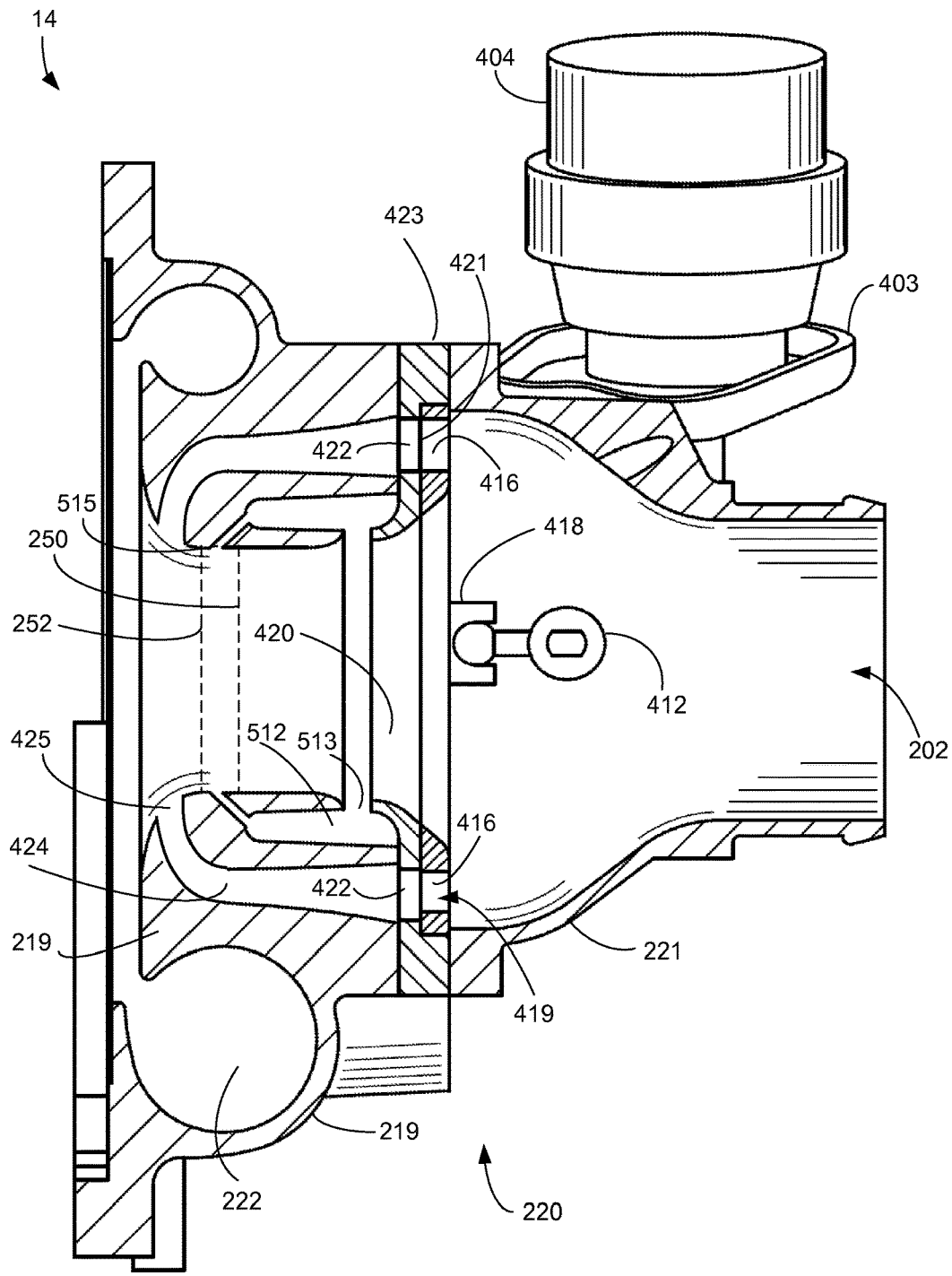
FIG. 6 shows a cross section of compressor components with the first embodiment of the casing treatment according to the present disclosure.

Turning now to FIG. 6, an outlet 425 of choke port 424 may be at a height of the impeller such that it is downstream of the leading edge of both the full blades 250 and the splitter blades 252. This height of the choke port outlet 425 relative to the compressor inlet 202 may effectively extend the compressor flow capacity. As a compressor reaches choke flow an engine controller may signal actuator 404 to rotate the actuatable annular disk such that choke slots 416 and 422 overlap allowing air flow to be drawn in by both the full blades and splitter blades through the exposed choke port inlet 419. Exposing choke port inlet 419 to the compressor inlet 202 may in essence inject air into the compressor downstream of both the full blades 250 and splitter blades 252 (leading edges of the respective blades indicated by dashed lines). An inlet, or downstream opening, 515 to bleed port 512 is located upstream of the leading edge of the splitter blades 252 but downstream of the leading edge of the full blades 250. The location of the bleed port is such that it may help to control surge.

Figure 7:
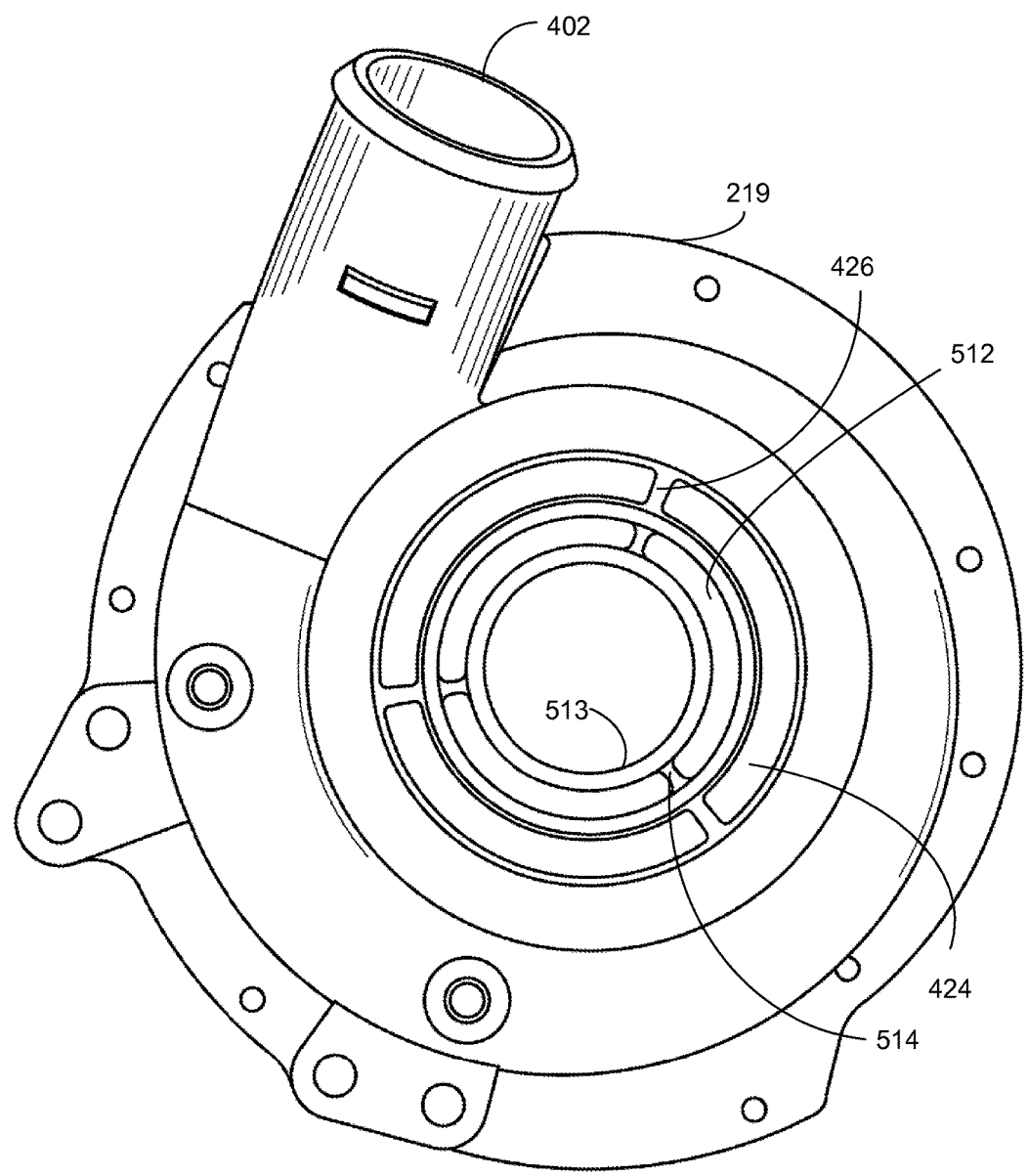
FIG. 7 shows a back view of section of an outer casing for a compressor with the first embodiment of the casing treatment according to the present disclosure.

With respect to FIG. 7, the bleed port 512 may be seen central to the choke port 424 within the outlet piece 219 of the compressor casing. The bleed port 512 and choke port 424 comprise structural pieces 514 and 426 respectively. The structural pieces may function to hold internal walls of outlet piece 219 together such that both the bleed port 512 and choke port 424 may extend from the upstream side of the outlet piece 219 to a lower portion at the interior of the compressor casing where an impeller would be located (not shown).

A second embodiment of a casing treatment in accordance with the present disclosure is shown in FIGS. 8-13. The second embodiment employs a pair of annular disks as described above in reference to the first embodiment shown in FIGS. 3-7. However, the shape, structure, relative dimensions and layout of the annular disks and greater compressor casing may vary without straying from the present disclosure. An example of such variation is described in reference to FIGS. 8-13.

Figure 8:
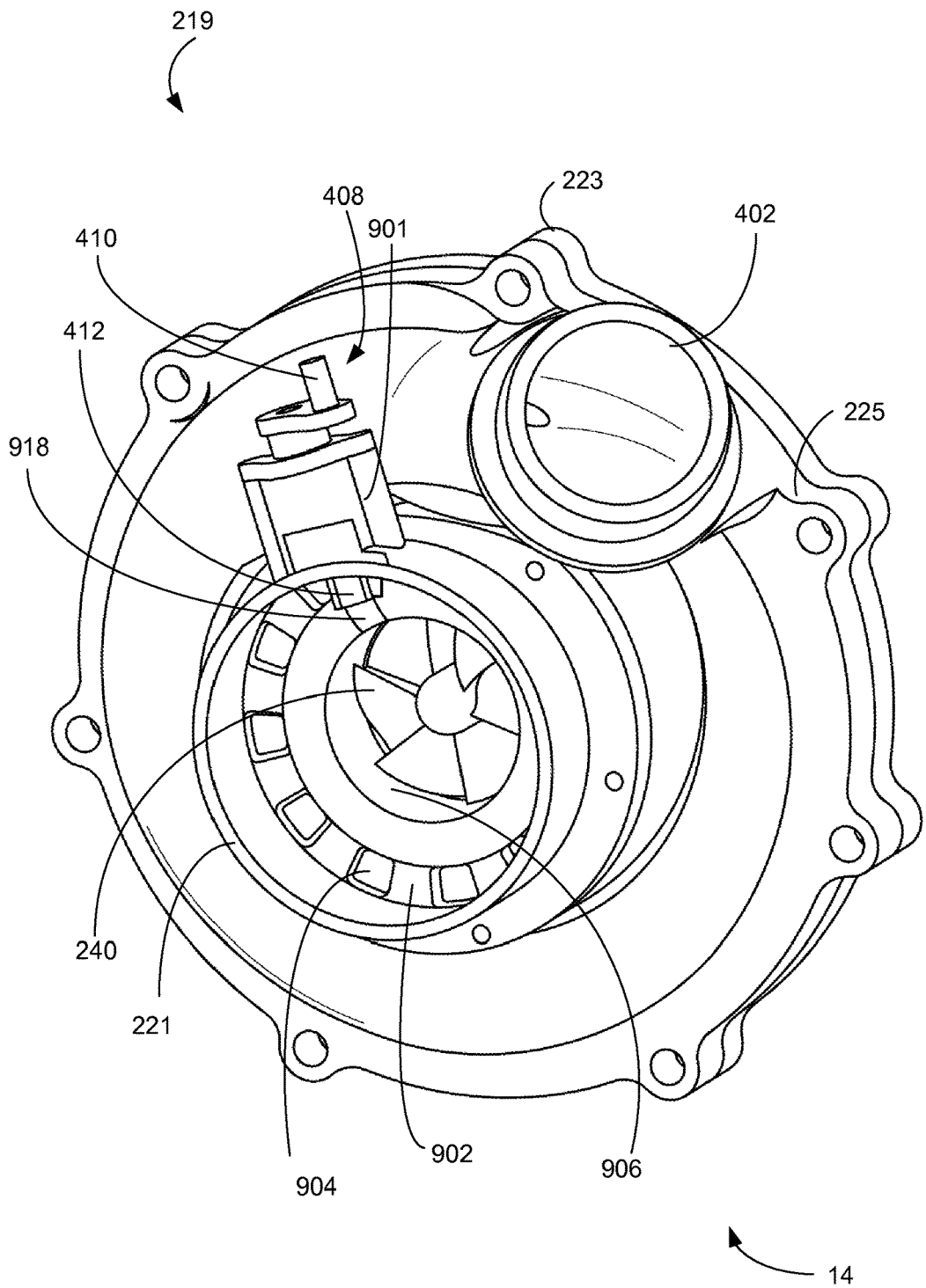
FIG. 8 shows a front view of a compressor with a second embodiment of a casing treatment according to the present disclosure.

FIG. 8 shows a perspective view of a compressor 14 from an inlet side. The compressor inlet 202 is formed in inlet piece 221 of compressor casing 220. The inlet piece 221 in the second embodiment incorporates an integral housing 901 for a choke slot controller 408. As described above in reference to FIG. 3 an actuator may control a choke slot controller, the actuator may be a vacuum, pneumatic, or electric actuator. Lever arm 410 may be connected to such an actuator (not shown in FIG. 8). Movement of the actuator may be translated to lever arm 410 causing an actuator pin 412 to rotate actuatable annular disk 902 relative to outer annular disk 906. This rotation of the actuatable annular disk 902 may result in alignment of choke slots 904 with the choke slots of the outer annular disk 906. The choke slots 904 of the present embodiment are shown as rectilinear as opposed to the circular choke slots described above. It should be appreciated that the choke slots may take any configuration or shape including square, rectangular, circular, ellipsoid, or other as long as the choke slots may overlap between the actuatable annular disk and outer annular disk. Furthermore, the choke slots of the two disks may not be identical in shape or size.

As above, the actuatable annular disk is surrounded, at its circumference, by outer annular disk 906 which also may form an interface between inlet piece 221 and the outlet piece 219 of the compressor casing. In this embodiment, the outlet piece of the compressor casing may be comprised of two pieces bolted together. An upper component 225 is bolted to a lower component 223 to form the outlet piece 219 of the compressor casing.

Figure 9:
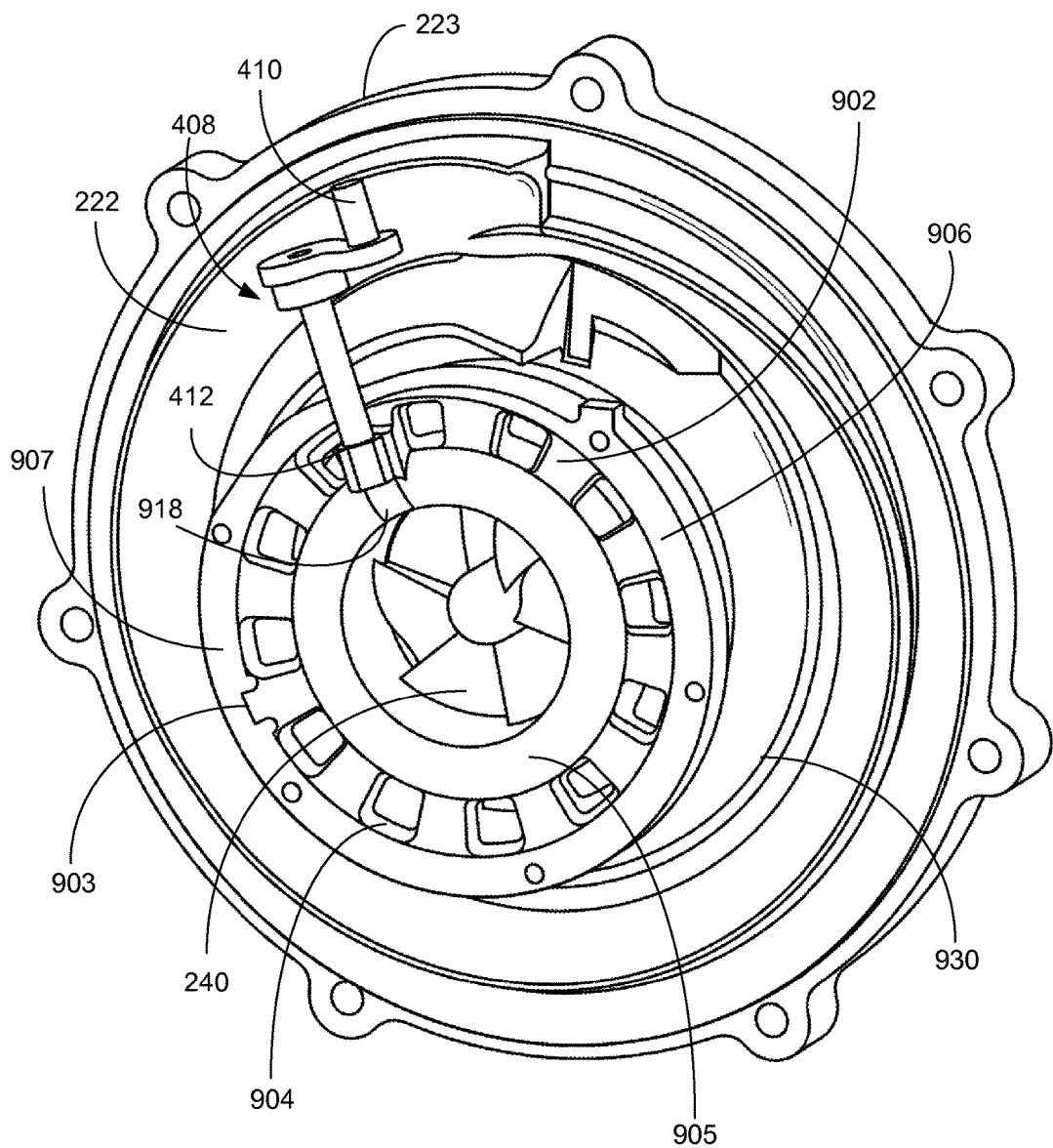
FIG. 9 shows a front view of compressor components with the second embodiment of the casing treatment of the present disclosure.

Turning now to FIG. 9, a view of the second embodiment of the compressor casing treatment is shown from the same vantage point as that in FIG. 8, however in FIG. 9 inlet piece 221 and upper component 225 of the outlet piece of the compressor casing have been removed. In this view, choke slot controller 408 may be seen.

The outer annular disk of the present disclosure comprises an upstream wall of both a bleed port and a choke port. The outer annular disk 906 comprises an inset portion 921 at its inner circumference (visible in FIG. 10), the periphery of which is sized to accommodate the actuatable annular disk 902 therein. The inset portion may allow the actuatable annular disk to rest inside the outer annular disk flush with the raised portion 923. An inlet for a bleed port is located downstream of a raised lip 905 of the actuatable annular disk 902 of the present disclosure. The bleed port and choke port will be readily visible and described in greater detail below in reference to FIGS. 12 and 13.

At the center of the paired annular disks may be an impeller 240. At the interface of the outer annular disk 906 and the lower component 223 of the outlet piece of the compressor casing, may be an inner casing 930. The inner casing 930 may form the inner volumes, channels or ports by which air may flow into the lower portions of the impeller when the choke slots are aligned. The bleed port and choke port may be formed by the inner casing as concentric, cylindrical channels extending axially around the compressor. The inner casing may also form an interface between the outer compressor casing 220 and the paired annular disks such that they may fit together in a stacked and substantially airtight fashion. In a different embodiment, for example that described above with referenced to FIGS. 3-7, the inner casing may be integral to the outlet piece 219 of compressor casing 220, such that they are a single component.

Figure 10:
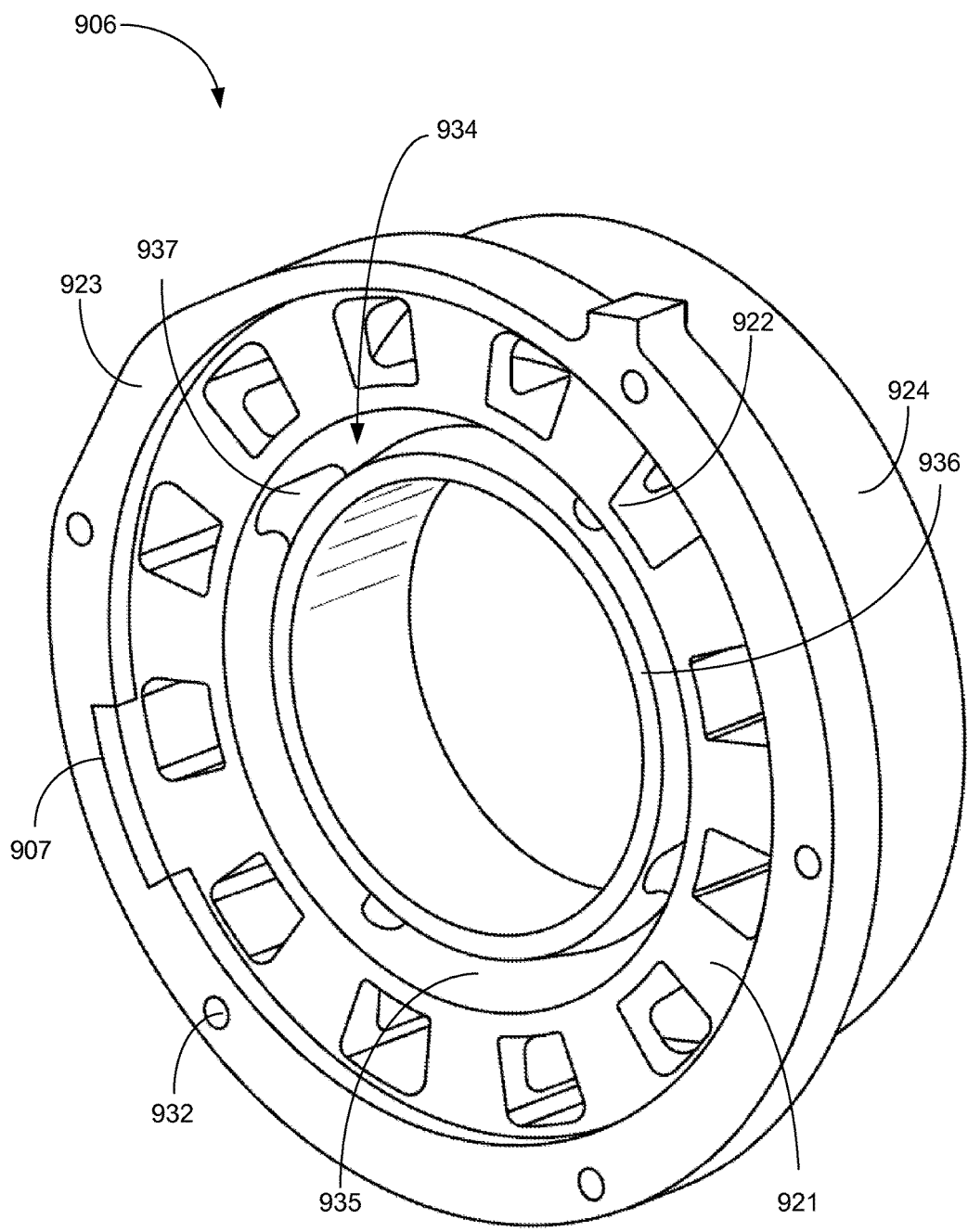
FIG. 10 shows a front view of an annular disk of the second embodiment of the casing treatment of the present disclosure.

Turning now to FIG. 10, the outer annular disk is shown. The outer annular disk of the present disclosure comprises a raised portion 923 along the circumference of the surface closest to compressor inlet 202. The raised portion 923 may comprise bolt holes 932 for attaching outer annular disk 906 between inlet piece 221 and upper component 225 of outlet piece 219.

Outer annular disk may further comprise an inset portion 921. The circumference of the inset portion may be sized such that the actuatable annular disk 902 may rest within the inset portion 921. The inset portion 921 may further comprise choke slots 922. The choke slots 922 of outer annular disk 906 may align with the choke slots 904 of the actuatable annular disk 902, or may be offset, dependent on the position of actuator pin 412 (shown in FIG. 11).

The outer annular disk 906 of the present embodiment may further comprise a bleed port 934. The bleed port 934 may comprise an inner wall 936 that extends centrally from the inset portion 921. The inner wall 936 may be held away from bleed port 934 by structural pieces 937 such that the bleed port 934 may comprise an opening 935 upstream in the compressor inlet 202. The upstream opening 935 of the bleed port may serve as an outlet for air to recirculate off the impeller 240 into the compressor inlet 202 in the event of surge. The bleed port 934 extends downstream in the compressor toward the base of impeller 240, an orientation that will be described below in greater detail with reference to FIG. 12. The upstream opening of the bleed port may serve as the outlet of the bleed port as during surge this port will function to allow the recirculation of air off the top of the impeller 240.

The outer annular disk 906 of the present embodiment may comprise a greater extent of the inner walls of a compressor casing treatment of the present disclosure than the first embodiment shown in FIGS. 3-7. The greater depth of the outer annular disk 906 provided in part by flange 924 may allow for the integration of these various components into the outer annular disk. However, it should be appreciated that a flatter annular disk, such as shown at 420 in FIG. 4 may be coupled with an outer compressor casing that comprises the inner walls analogous to the bleed port and inner casing to accomplish the goals of the present disclosure.

Figure 11:
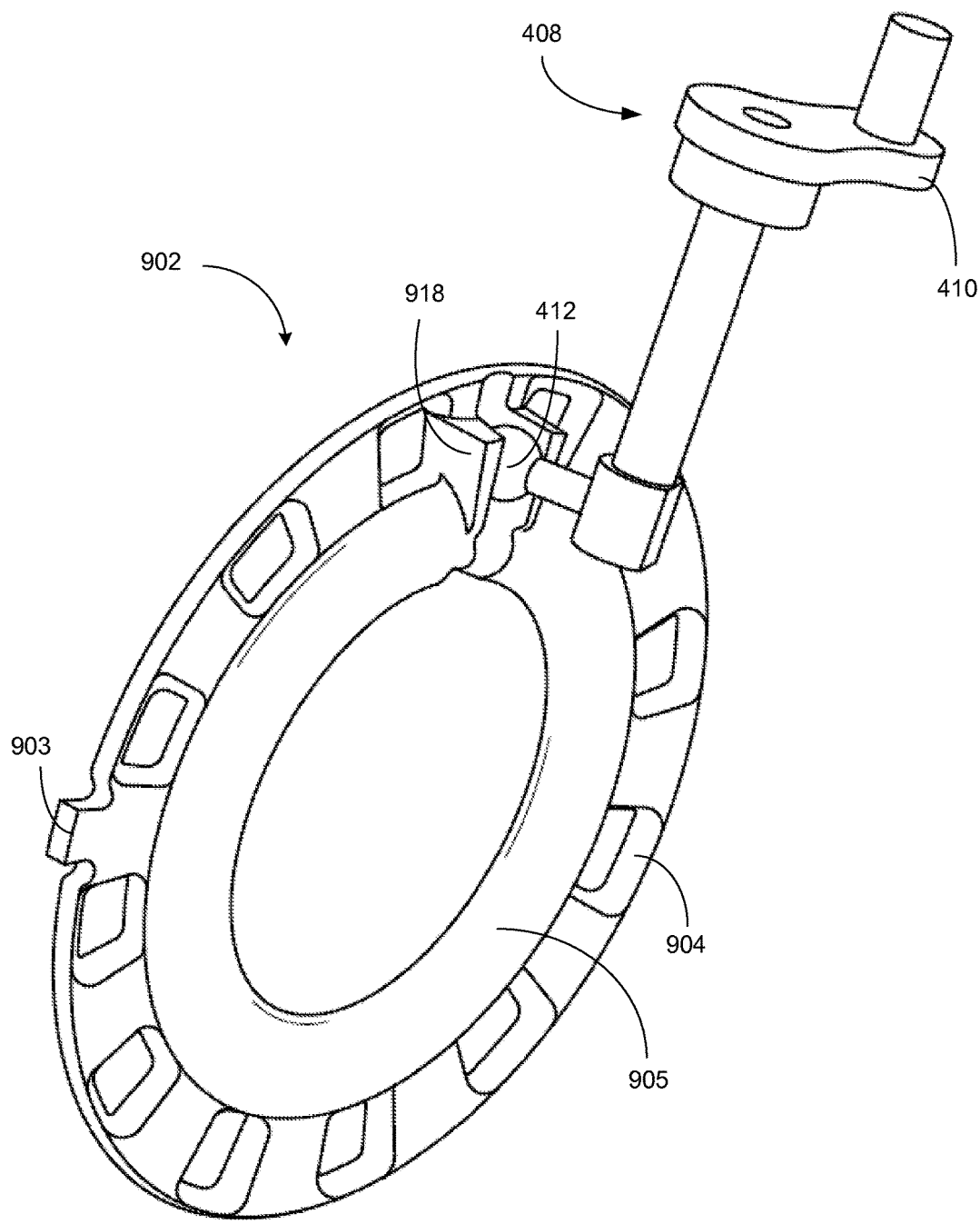
FIG. 11 shows a front view of an actuatable annular disk of the second embodiment of the casing treatment of the present disclosure.

Turning now to FIG. 11, the actuatable annular disk 902 is shown with the choke slot controller 408. The actuatable annular disk 902 may be configured to rest within the inset portion 921 of the outer annular disk 906. A rotation limiter 903 may extend beyond the substantially circular circumference of the actuatable annular disk 902. The rotation limiter 903 is configured to fit within the confines of a grooved rotation slot 907 within the raised portion 923 of outer annular disk 906 (shown in FIG. 9). The rotation limiter may move within the rotation slot to the extent allowed by the size of the rotation slot. This grooved section provides a stop such that the actuatable annular disk may not rotate beyond the bounds of control by choke slot controller 408. The length of the rotation limiter may be determined by the size, shape and spacing of the choke slots along the actuatable annular disk and the outer annular disk.

Along its inner circumference actuatable annular disk 902 comprises a raised inner lip 905. The raised inner lap may be elevated from the outer circumference of the actuatable annular disk in a direction toward the compressor inlet 202 and may serve to extend over the bleed port wall 936 without blocking air exit from the bleed port 934. The orientation of the raised inner lip 905 to bleed port 934 is more readily seen in FIG. 13.

The actuatable annular disk 902 may comprise choke slots 904. The choke slots 904 of the actuatable annular disk 902 may align with the choke slots 922 of the outer annular disk 906 dependent on the rotation of the disk by the actuator pin 412. The actuator pin 412 may be seen at the base of choke slot controller 408. The pin may have a rounded ball at its base which rests within the grooved choke selector 918 formed on the actuatable annular disk. Movement of the actuator interface causes a rotation of the actuator pin such that the base pushes against the raised sidewalls of choke selector 918. The force on choke selector 918 may result in a rotation of the actuatable annular disk 902 within the inset portion of the outer annular disk causing the choke holes to align or misalign.

Figure 12:
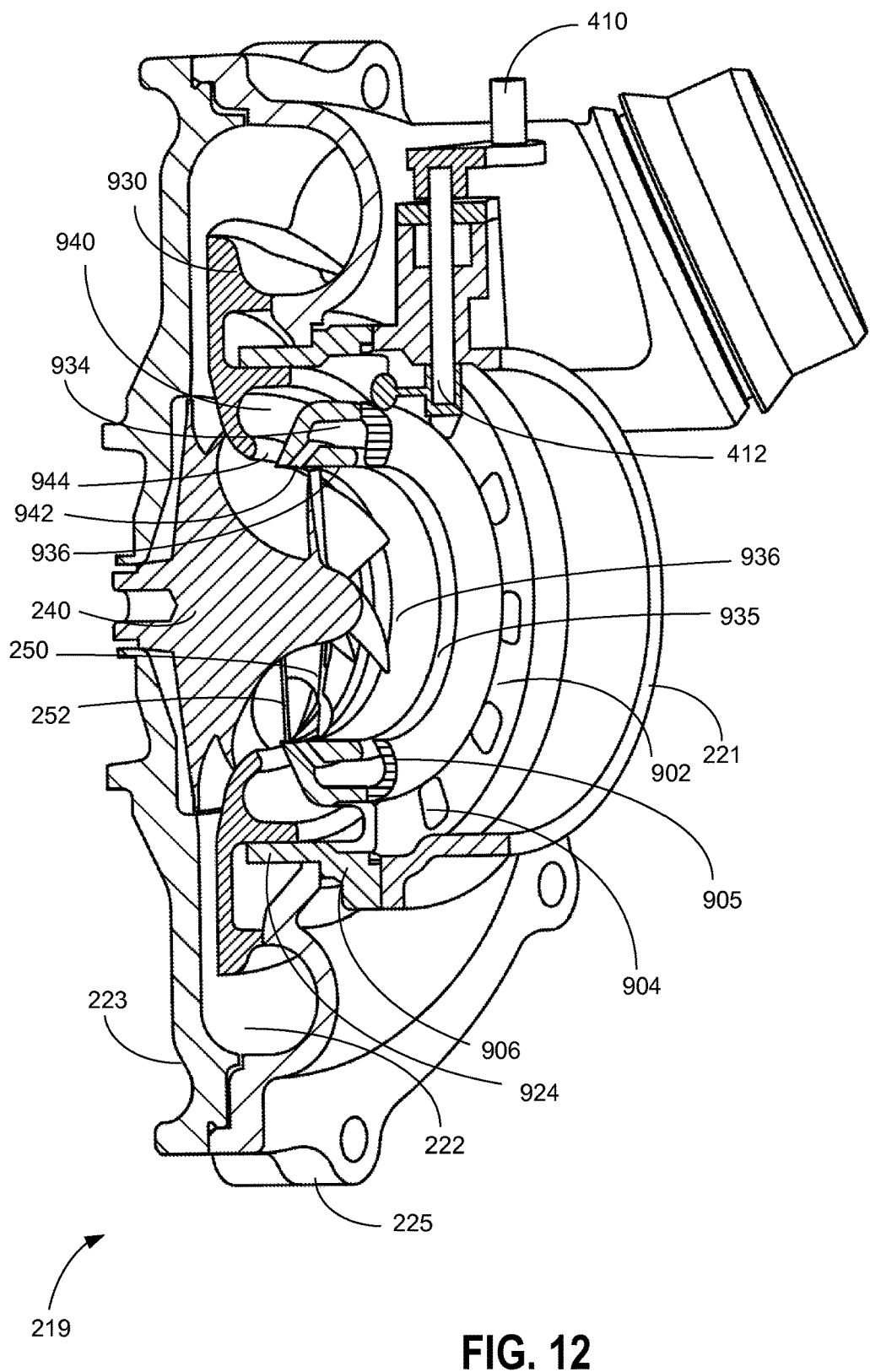
FIG. 12 shows a cross section in perspective view of compressor components with the second embodiment of the casing treatment according to the present disclosure.

Turning now to FIG. 12, a cross section in perspective view is shown of a second embodiment of the compressor casing treatment in accordance with the present disclosure. The annular disks may be positioned between an inlet piece 221 and an outlet piece 219. The outer annular disk 906 fits around the periphery of the actuatable annular disk 902. In FIG. 12, the choke slots 904 of the actuatable annular disk are aligned with the choke slots 922 of the outer annular disk 906.

When aligned, the choke slots allow air from compressor inlet 202 into the choke port inlet 919. The choke port outlet 944 may be formed at the bottom by inner casing 930 and at its upstream edge by outer annular disk 906. The choke port is arranged such that when the choke slots are aligned air may be pulled into the impeller 240 at a height downstream the leading edge of the splitter blades 252 and full blades 250. The choke port may be opened or closed as a function of the placement of actuator pin 412. The choke port may be opened if the compressor is at or near choke conditions.

Conversely the bleed port 934 may be continually open to compressor inlet 202 and may function to prevent surge. The bleed port inlet 942 is arranged at a height downstream of the leading edge of full blades 250 of impeller 240, but upstream of the leading edge of splitter blades 252. The inner wall 936 of the bleed port 934 is formed as the innermost portion of outer annular disk 906. The upstream edge of the inner wall 936, closest the compressor inlet 202, is offset downstream from the raised lip 905 of the actuatable annular disk 902 such that a space may be provided where the bleed port is open to the compressor inlet 202.

The outer annular disk 906 is held in place at a joint between the inlet piece 221 and the upper component 225 of the outlet piece 219. The flange 924 extending toward the base of the compressor may form a wall of the choke port and may furthermore provide an interface or structural component with which inner casing 930 may be connected. In other embodiments of a compressor casing treatment of the present disclosure, inner casing 930 and flange 924 may be integrated into outlet piece 219. An example of different orientation of inner components of the compressor is described above in reference to FIGS. 3-7.

Figure 13:
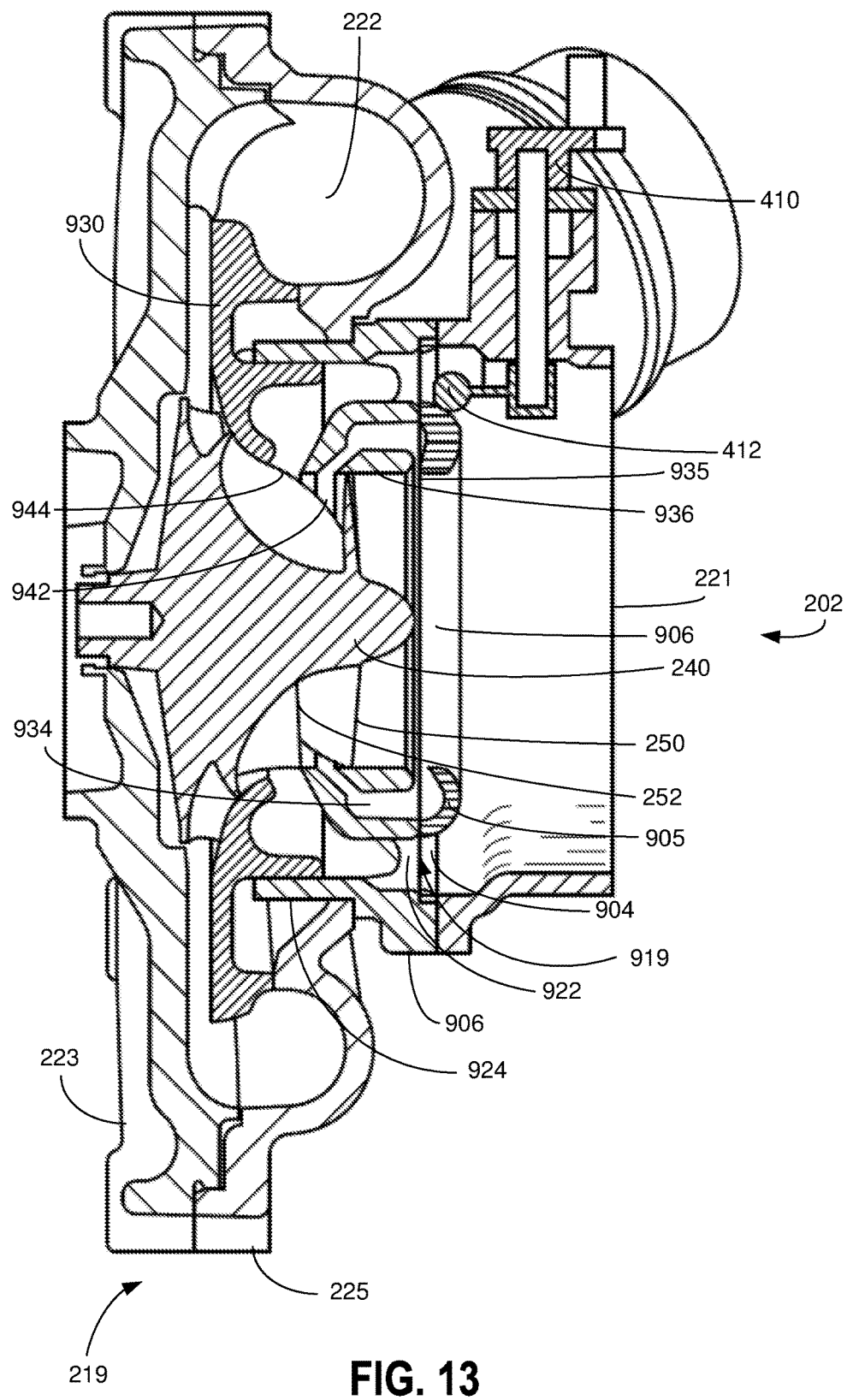
FIG. 13 shows a cross section of compressor components with the second embodiment of the casing treatment according to the present disclosure.
Figure 14:
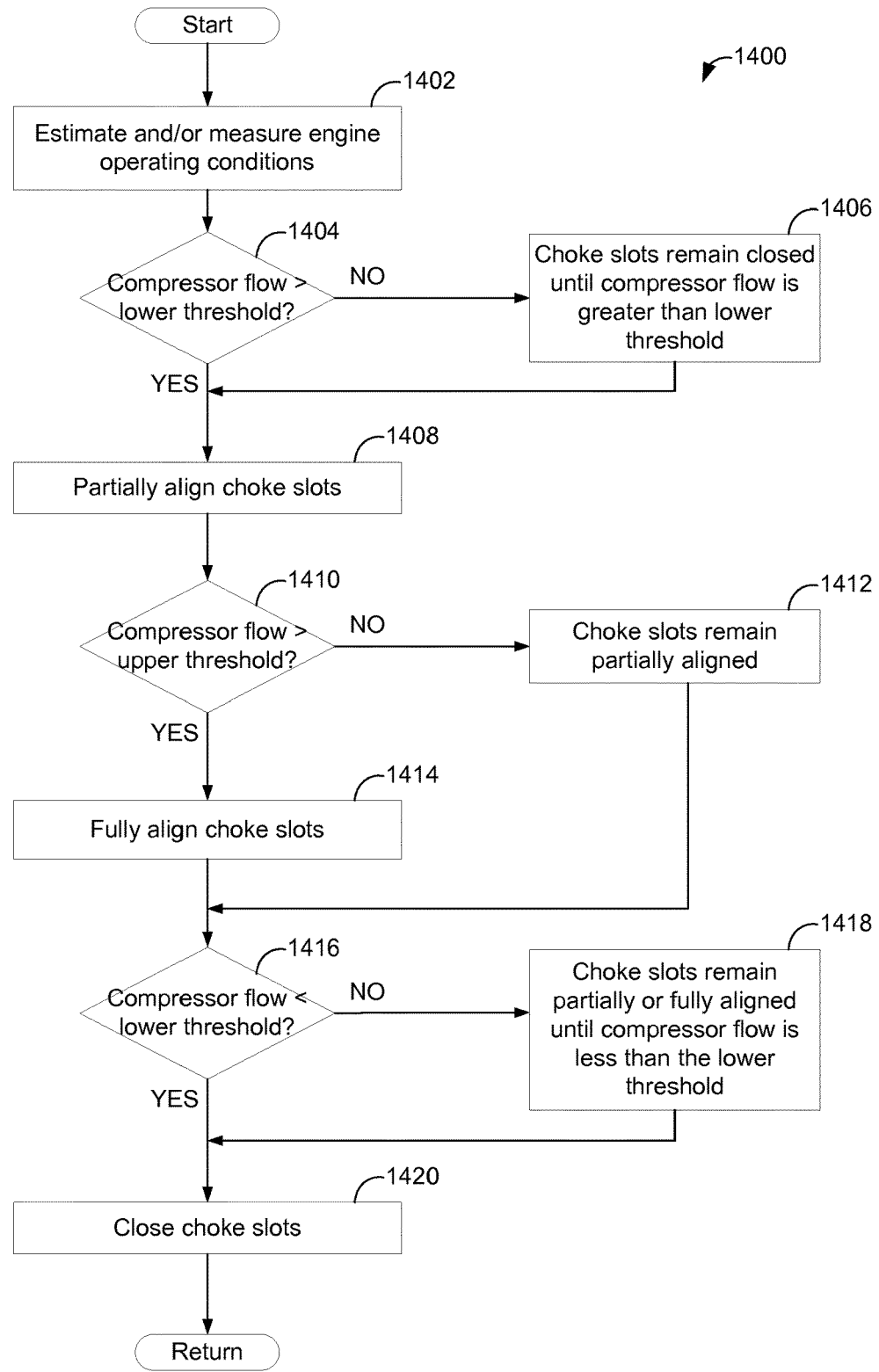
FIG. 14 shows a flow chart of a method in accordance with the present disclosure.

Turning to FIG. 13, the same components are shown as in FIG. 12, but in a cross sectional view. The relative alignment of components along the horizontal axis of FIG. 13 may be visible in this view. Raised lip 905 may be closer to compressor inlet 202 than the base of actuatable annular disk 902. This raised lip 905 may be spaced apart from inner wall 936 such that a gap is seen at the upstream opening of bleed port 934 that is continuously open to airflow from compressor inlet 202.

Furthermore, the relative alignment of bleed port inlet 942 may be further from the compressor inlet 202 than the leading edge of full blades 250. The choke port outlet 944 is further still from the compressor inlet 202. The choke port outlet 944 is arranged closer to the base of the compressor than the leading edges of full blades 250 and splitter blades 252. The bleed port inlet is the downstream opening of the bleed port, whereas the choke port outlet is the downstream opening of the choke port, due to the direction of air flow through the two spaces under surge and choke conditions respectively.

Variations to the shape and actuation of annular disks and other compressor components of the present disclosure are possible without straying from the intent of the disclosure. As illustrated by the first and second example embodiment of the present disclosure the integration and shape of components may differ. Alterations to the size and shape of components, construction materials, control signaling, etc. may be included in the scope of the present disclosure.

Furthermore, optimization of the described casing treatments is possible as an active casing treatment may be used to extend the operating range of a turbocharger. However, the flow of gasses, and thus the operating range of a turbocharger, may not be independent of the geometry and the aerodynamic properties of other elements in the turbocharger, such as the impeller blades and the turbine blades. Therefore, combining an active casing treatment with aerodynamic compressor and turbine components may further extend the operating range of the turbocharger. A computational fluid dynamics (CFD) simulation may be used to simulate the effect of compressor blade and turbine blade geometries, bleed port and injection port locations and sizes, etc. to the flow of gasses through the turbocharger. A CFD simulation may also account for interdependencies between each of the elements in the turbocharger. By varying the geometry of elements in the turbocharger and simulating the effects on the flow of gasses, the operating range of the turbocharger may be extended. CFD simulation software is commercially available and may be purchased from ANSYS, Inc. of Canonsburg, Pa. or NUMECA International of Brussels, Belgium, for example.

Turning now to FIG. 14, a method in accordance with the present disclosure is shown. The method 1400 may be representative of instructions for engine controller 12 which may be stored in read only memory 106. The method 1400 may be carried out by engine controller 12 to adjust the choke slots of the present disclosure responsive to engine operating parameters. The method starts at 1402 with engine operating parameters being estimated and/or measured. Such conditions may include engine speed, load, air-fuel ratio, manifold absolute pressure (MAP) and others. MAP may be indicative of compressor function, including impeller speed and compressor flow rate. Furthermore, a compressor flow sensor may be used that determines the airflow through the compressor for a given impeller rotational speed. Engine speed, load and air-fuel ratio may be used to estimate a turbine rotational speed. Furthermore, turbine speed and manifold pressure may be used in estimating compressor flow which may be used to determine if a compressor is near surge or choke conditions.

At 1404 it is determined if the compressor flow is above a lower threshold. A lower threshold may be chosen based relative to choke flow. The lower threshold may differ for different engines or compressors. The lower threshold flow may be related to the rotational speed of the impeller and a flow rate through a compressor. If at 1404, the compressor flow is not greater than the lower threshold (NO) the method proceeds to 1406 where the choke slots remain closed until the compressor flow is greater than the lower threshold.

If at 1404, the compressor flow is greater than the lower threshold (YES) the method proceeds to 1408, where the choke slots are partially aligned. Partial alignment is achieved by rotation of the actuator pin 412. Partial alignment of the choke slots will open the inlet of the choke port to the inlet of the compressor but may provide less airflow to the base of the impeller than full overlap or alignment of the choke slots.

At 1410, it is determined if the compressor flow is greater than an upper threshold. If at 1410, the compressor flow is not greater than the upper threshold (NO) the method proceeds to 1412 where the choke slots remained partially aligned. If at 1410, the compressor flow is greater than the upper threshold (YES) the method proceeds to 1414 where the choke slots are fully aligned. Full alignment of the choke slots allows maximal exposure of the choke port inlet to the compressor inlet. In an alternative embodiment, a single compressor flow threshold may exist above which the choke slots will be fully aligned. Alternatively, above a single threshold the choke slots may vary from minimal alignment to fully aligned in a continuously variable fashion commensurate with compressor flow above a threshold. The choke slots may be fully aligned when the rotation limiter 903 is at one edge of the grooved rotation slot 907. The other edge of the grooved rotation slot 907 may represent a position where the choke slots are fully closed.

At 1416, it is determined if the compressor flow has dropped below the lower threshold. If the compressor flow is not below the lower threshold (NO) the choke slots remain partially or fully aligned until the compressor flow falls below the lower threshold. If at 1416, the compressor flow is below the lower threshold (YES) the choke slots are closed at 1420. The method then returns.

The method and system of the present disclosure allows for the continual exposure of an upstream opening of an inner bleed port to a compressor inlet while intermittently exposing an inlet to a choke port to the compressor inlet. In one example, the exposure of the choke may be intermittent, where the inlet is not exposed (e.g., blocked) during some engine operating conditions, and exposed (partially and/or fully, and thus not blocked) during other engine operating conditions. Selectively exposing the upstream opening or inlet of the choke port to the compressor inlet may be achieved by the rotation of the actuatable annular disk relative to the outer annular disk at the control of engine control 12. The alignment of the choke slots in the two annular disks may vary from not aligned to fully aligned, as well as various degrees therebetween, such that the airflow into the choke port inlet may vary. This variance in airflow may be exploited at different compressor flow thresholds such that choke port inlet may be further exposed as compressor flow increasingly approaches choke. For example, exposure to the inlet to the choke port may increase proportional to a flow in excess of a compressor flow threshold such that the choke slots are increasingly aligned at higher compressor flows.

Systems and methods are disclosed for a turbocharger compressor, the system comprising: an actuatable annular disk comprising choke slots therein; an outer annular disk comprising choke slots therein; and an actuator to rotate the actuatable annular disk relative to the outer annular disk to vary alignment of the choke slots of the actuatable annular disk and the outer annular disk. The actuator may be controlled by an engine controller responsive to operating conditions of the compressor and actuated to align choke slots. Alignment of the choke slots allows air to be drawn into the impeller effectively expanding the compressor flow capacity to prevent compressor choke.

Note that the example control and estimation routines included herein can be used with various engine and/or vehicle system configurations. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A system for a turbocharger compressor comprising:
an actuatable annular disk comprising choke slots therein;
an outer annular disk comprising choke slots therein; and
an actuator pin contacting an outer surface of the actuatable annular disk, where the actuator pin rotates the actuatable annular disk relative to the outer annular disk to vary alignment of the choke slots of the actuatable annular disk and the outer annular disk via rotation of the actuator pin to push a base of the actuator pin against raised sidewalls positioned on the outer surface of the actuatable annular disk,
wherein the outer surface of the actuatable annular disk faces a compressor inlet,
wherein the choke slots are openings that extend through the outer surface of the actuatable annular disk facing the compressor inlet,
wherein the outer surface of the actuatable annular disk is perpendicular to a rotational axis of an impeller, and
wherein the choke slots are openings that are substantially parallel with a direction of air flow at an inlet of the turbocharger compressor.

2. The system of claim 1, wherein each of the choke slots is positioned adjacent an inlet of a choke port, the choke port being exposed to the compressor inlet when the choke slots are aligned, an outlet of the choke port being in fluid communication with the impeller at a position downstream of a leading edge of splitter blades and a leading edge of full blades of the impeller.

3. The system of claim 2, further comprising a bleed port, an outlet of which is continuously open to the compressor inlet and an inlet of which is in fluid communication with the impeller upstream of the leading edge of the splitter blades and downstream of the leading edge of the full blades.

4. The system of claim 1, wherein the base of the actuator pin is a rounded ball.

5. The system of claim 3, wherein the choke port and the bleed port comprise concentric, annular channels in an interior of the compressor.

6. The system of claim 3, wherein the bleed port recirculates air toward the compressor inlet responsive to compressor surge, and wherein the choke port provides air to a base of the impeller.

7. The system of claim 1, where the actuatable annular disk is rotated about a same axis of rotation as the impeller of the turbocharger compressor.

8. The system of claim 1, wherein the outer annular disk comprises an inset portion at its inner circumference, a periphery of the inset portion aligning with an outer circumference of the actuatable annular disk positioned therein.

9. The system of claim 8, wherein the outer annular disk comprises a bleed port inner wall at its inner circumference spaced apart from the inset portion.

10. The system of claim 9, wherein the actuatable annular disk comprises a raised lip that extends over the bleed port inner wall such that an upstream opening of a bleed port is exposed to the compressor inlet.

11. The system of claim 1, wherein rotation of the actuatable annular disk relative to the outer annular disk is limited by a rotation limiter within a rotation slot on the outer annular disk.

12. A system for a turbocharger compressor, comprising:
an inlet piece of a compressor casing;
an outlet piece of the compressor casing;
an outer annular disk between the inlet piece and the outlet piece, the outer annular disk comprising an inset portion sized to fit an actuatable annular disk, the outer annular disk and the actuatable annular disk both comprising choke slots around their respective circumferences;
an impeller positioned within the outlet piece downstream from the outer annular disk;
an actuator to rotate the actuatable annular disk relative to the outer annular disk to vary alignment of the choke slots therein,
wherein the choke slots of the actuatable annular disk are openings that extend in a direction substantially parallel to a rotational axis of the impeller through the actuatable annular disk, including through an outer surface of the actuatable annular disk,
wherein the outer surface of the actuatable annular disk is a surface of the actuatable annular disk facing an inlet of the compressor,
wherein the outer surface of the actuatable annular disk is perpendicular to the rotational axis of the impeller, and
wherein the choke slots of the outer annular disk are openings that also extend through the outer annular disk in the direction substantially parallel to the rotational axis of the impeller,
an inlet to a choke port exposed to the inlet of the compressor when the choke slots align, the choke port having an outlet in fluid communication with the impeller at a position downstream of a leading edge of splitter blades and a leading edge of full blades to inject air downstream of both the full blades and the splitter blades when the choke slots align; and
a bleed port exposed to the inlet of the compressor, a bleed port inlet in fluid communication with the impeller at a position downstream of the leading edge of the full blades and upstream of the leading edge of the splitter blades.

13. The system of claim 12, further comprising an inner casing contained within the outlet piece, forming a downstream edge of the outlet of the choke port.

14. The system of claim 12, wherein the outer annular disk further comprises a flange extending toward a base of the impeller, forming an interface with an inner casing.

15. The system of claim 12, wherein the actuator to rotate the actuatable annular disk relative to the outer annular disk is positioned upstream of the choke slots, and wherein an actuator pin of the actuator engages with a groove of the actuatable annular disk.

16. A method comprising:
continually exposing an upstream opening of an inner bleed port to a compressor inlet; and
intermittently exposing an inlet of a choke port to the compressor inlet, the choke port being positioned concentrically outside the inner bleed port, the choke port exposed by rotating an actuatable annular disk comprising choke slots relative to a stationary outer annular disk, the actuatable annular disk and the stationary outer annular disk both positioned upstream of an impeller of a compressor, the choke slots positioned upstream of the inlet of the choke port,
wherein the choke slots are openings that extend through the actuatable annular disk and the stationary outer annular disk, including an outer surface of the actuatable annular disk,
wherein the choke slot openings of the actuatable annular disk and the stationary outer annular disk extend in a direction substantially parallel to both a direction of air flow at the compressor inlet and an axis of rotation of the actuatable annular disk, and
wherein the actuatable annular disk is rotated by rotating an actuator pin to push a base of the actuator pin against raised sidewalls of a groove of the outer surface of the actuatable annular disk, the outer surface of the actuatable annular disk facing the compressor inlet.

17. The method of claim 16, wherein exposing the compressor inlet to the choke port is in a continuously variable fashion dependent on alignment of the choke slots in the actuatable annular disk and choke slots of the stationary outer annular disk, wherein the stationary outer annular disk includes a plurality of choke slots that are alignable with the choke slots of the actuatable annular disk.

18. The method of claim 16, wherein the inlet of the choke port is exposed in response to compressor flow above a threshold compressor flow.

19. The method of claim 18, wherein variably exposing the inlet of the choke port is proportional to a flow in excess of the threshold compressor flow such that at higher flows the choke slots are aligned with increasing overlap.

20. The method of claim 16, wherein the actuator pin is rotated with a vacuum actuator, the actuator pin in contact with the actuatable annular disk.

* * * * *